US010137856B1

(12) United States Patent
Jimenez et al.

(10) Patent No.: US 10,137,856 B1
(45) Date of Patent: *Nov. 27, 2018

(54) SEATBELT SYSTEM INCLUDING OCCUPANT DETECTOR

(71) Applicant: Zoox, Inc., Menlo Park, CA (US)

(72) Inventors: Joshua Jimenez, San Francisco, CA (US); Andrew Piper, Palo Alto, CA (US); Timothy David Kentley-Klay, Stanford, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/847,191

(22) Filed: Dec. 19, 2017

Related U.S. Application Data

(63) Continuation of application No. 15/638,764, filed on Jun. 30, 2017, now Pat. No. 9,878,689.

(51) Int. Cl.
    *B60Q 1/00* (2006.01)
    *B60R 22/48* (2006.01)
    *B60R 21/015* (2006.01)

(52) U.S. Cl.
    CPC .......... *B60R 22/48* (2013.01); *B60R 21/0155* (2014.10); *B60R 21/01548* (2014.10);
    (Continued)

(58) Field of Classification Search
    CPC ................ B60R 22/48; B60R 21/0155; B60R 2022/4808
    (Continued)

(56) References Cited

U.S. PATENT DOCUMENTS

| 6,213,512 B1 | 4/2001 | Swann et al. |
| 6,285,937 B1 | 9/2001 | Buckley |

(Continued)

FOREIGN PATENT DOCUMENTS

FR        2761032        9/1998

OTHER PUBLICATIONS

Karthik, R., "Design and Development of Seat Belt Alert System with Ignition Interlocking in Four Wheeler", International Journal of Scientific and Research Publication, vol. 4, Issue 7, Jul. 2014, pp. 1-5.

(Continued)

*Primary Examiner* — Tai T Nguyen
(74) *Attorney, Agent, or Firm* — Lee & Hayes, PLLC

(57) ABSTRACT

A seatbelt system may include a seatbelt configured to constrain a waist and a torso of an occupant. The seatbelt may also include a coupling configured to selectively couple a portion of a vehicle and the seatbelt to one another. The system may also include a reel configured to receive at least a portion of the seatbelt, and a tension sensor associated with the coupling and/or the seatbelt and configured to generate a signal indicative of tension in the seatbelt. The system may also include a deployment sensor associated with the seatbelt and configured to generate a signal indicative of a length of the seatbelt deployed from the reel. The system may also include an occupant detector configured to determine, based at least in part on the signals indicative of tension and the length, whether an occupant is properly wearing the seatbelt, such that the seatbelt constrains the occupant.

22 Claims, 5 Drawing Sheets

(52) U.S. Cl.
CPC . *B60R 21/01544* (2014.10); *B60R 2022/4808* (2013.01); *B60R 2022/4825* (2013.01); *B60R 2022/4841* (2013.01)

(58) Field of Classification Search
USPC .... 340/457.1, 5.71, 426, 428, 668; 280/806, 280/807
See application file for complete search history.

(56) References Cited

U.S. PATENT DOCUMENTS

| | | | |
|---|---|---|---|
| 7,299,119 B2 | 11/2007 | Sugiura | |
| 7,418,026 B2 * | 8/2008 | Asjadi | H04L 27/2647 375/136 |
| 9,365,186 B2 | 6/2016 | Gulash | |
| 9,415,746 B1 | 8/2016 | Johnson | |
| 2002/0130545 A1 * | 9/2002 | Tanji | B60R 22/44 297/480 |
| 2005/0206152 A1 | 9/2005 | Delventhal et al. | |
| 2006/0000657 A1 | 1/2006 | Gray | |
| 2006/0076761 A1 | 4/2006 | Brown et al. | |
| 2007/0195990 A1 | 8/2007 | Levy | |
| 2007/0282505 A1 | 12/2007 | Bolton et al. | |
| 2008/0267460 A1 | 10/2008 | Aoki et al. | |
| 2011/0241318 A1 | 10/2011 | Miyajima | |
| 2014/0303851 A1 | 10/2014 | Nagasawa, Sr. | |

OTHER PUBLICATIONS

Sheth, Priyal N., "Developing Safety System for Monitoring Seat Belt and Controlling Speed Accordingly to Avoid Fatal Injuries", International Journal of Scientific and Research Publications, vol. 5, Issue 10, Oct. 2015, pp. 1-5.
The PCT Search Report and Written Opinion dated Oct. 8, 2018, for PCT Application No. PCT/US2018/039732, 16 pages.

* cited by examiner

SEATBELT SYSTEM INCLUDING OCCUPANT DETECTOR

CROSS-REFERENCE TO RELATED APPLICATIONS

This application is a continuation and claims the benefit of priority based on U.S. application Ser. No. 15/638,764, filed Jun. 30, 2017, now U.S. Pat. No. 9,878,689 B1, issued Jan. 30, 2018, the entire disclosure of which is incorporated herein by reference.

BACKGROUND

A seatbelt is often used for an occupant of a vehicle to protect the occupant from injury during a collision involving the vehicle. Despite laws requiring seatbelt use, many occupants fail to properly wear a seatbelt, sometimes resulting in harm to the occupant. For example, an occupant may either fail to deploy and buckle a seatbelt, or they may improperly wear it, for example, by buckling the seatbelt, but not wearing it in a manner that would provide protection during a collision involving the vehicle.

A seatbelt is often used for an occupant of a vehicle to protect the occupant from injury during a collision involving the vehicle. Despite laws requiring seatbelt use, many occupants fail to properly wear a seatbelt, sometimes resulting in harm to the occupant. For example, an occupant may either fail to deploy and buckle a seatbelt, or they may improperly wear it, for example, by buckling the seatbelt, but not wearing it in a manner that would provide protection during a collision involving the vehicle.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
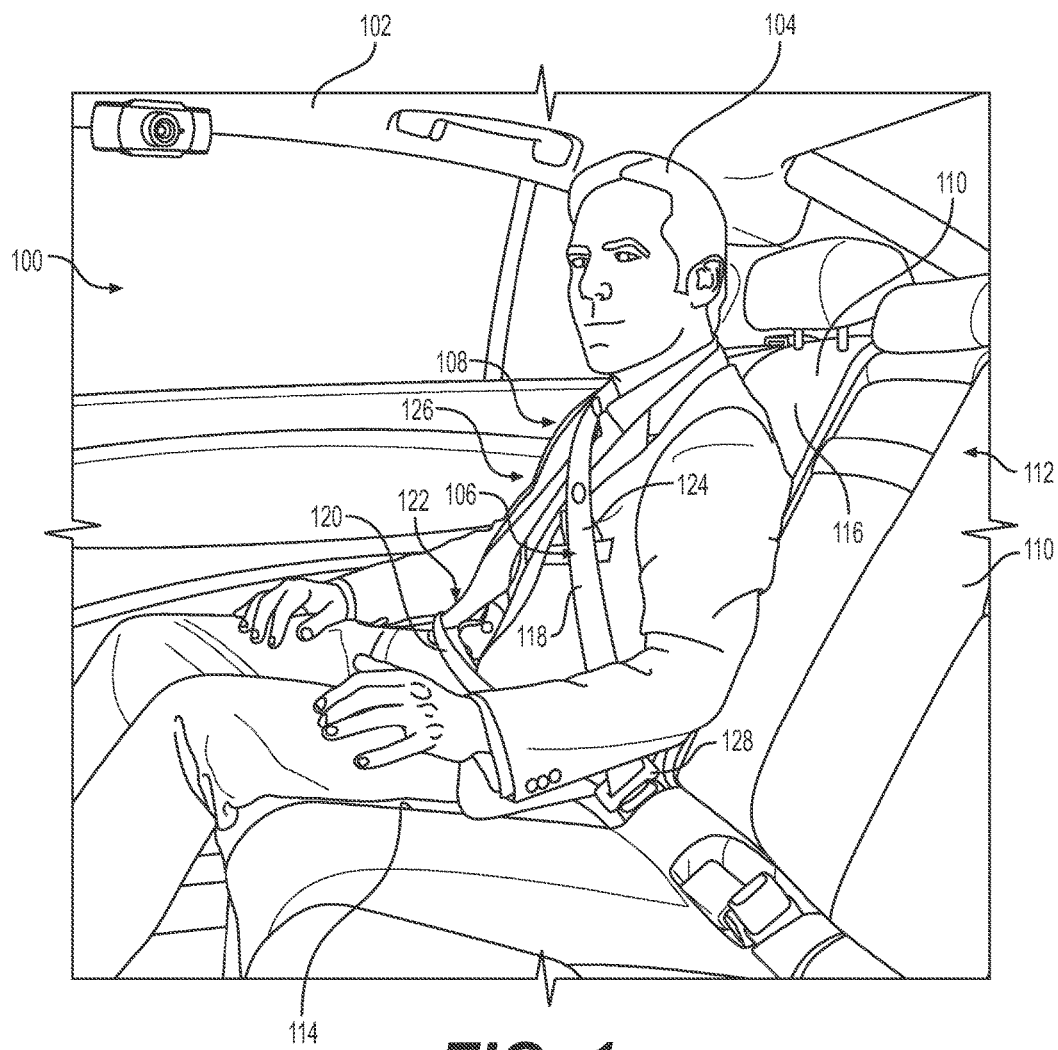
FIG. 1 is a perspective view of a person wearing an example seatbelt of an example seatbelt system.

As mentioned above, a seatbelt may be used for an occupant of a vehicle to protect the occupant from injury during a collision involving the vehicle. Some occupants fail to properly wear the seatbelt. In an attempt to ensure that occupants wear a seatbelt, some vehicles may include a warning system that illuminates a warning light and/or sounds an audible warning if the presence of an occupant is detected in a seat of the vehicle in combination with the vehicle detecting the lack of use of the seatbelt by the occupant. However, such warning systems may fail to detect when the occupant improperly wears the seatbelt, for example, by buckling the seatbelt, but not wearing it in a manner that would provide protection during a collision involving the vehicle. For example, the occupant may buckle the seatbelt, but sit on top of the buckled seatbelt, or sit in front of the shoulder strap of the seatbelt, thereby compromising the effectiveness of the seatbelt. In addition, some vehicles may include an airbag system, and the airbag system may be designed to deploy an airbag at different deployment rates, volumes, and/or pressures, depending on whether an occupant is wearing a seatbelt. Thus, such systems may not deploy an airbag according to design if the occupant has buckled the seatbelt but is not wearing it properly, resulting in possible harm to the occupant during a collision involving the vehicle. Some embodiments disclosed herein may address or mitigate the above-noted drawbacks.

This disclosure is generally directed to a seatbelt system including an occupant detector. In some examples, the occupant detector may be configured to determine whether an occupant of a vehicle is wearing a seatbelt and/or whether they are wearing the seatbelt properly.

In some examples, a seatbelt system may include a seatbelt including a belt portion. The belt portion may include a lap portion configured to constrain the waist of an occupant, and a sash portion configured to constrain the torso of the occupant. The seatbelt may also include a coupling configured to couple the lap portion and/or the sash portion to a portion of the vehicle and/or to one another. The seatbelt system may also include a reel configured to receive a portion of the sash portion or a portion of the lap portion. The seatbelt system may also include a tension sensor associated with the coupling, the belt portion, and/or the reel and configured to generate signals indicative of tension in the lap portion and/or the sash portion. The system may also include a deployment sensor associated with the lap portion and/or the sash portion. In some examples, the deployment sensor may be configured to generate signals indicative of the length of the lap portion or the sash portion deployed from the reel. The seatbelt system may also include an occupant detector in communication with the tension sensor and the deployment sensor and configured to determine, based at least in part on the signals indicative of tension and the signals indicative of the length, whether the occupant is properly wearing the seatbelt, such that the lap portion and the sash portion constrain the occupant. For example, an occupant may properly wear the seatbelt when the occupant is seated upright in a seat associated with the seatbelt with the coupling providing engagement between the seatbelt and a portion of the vehicle, the waist of the occupant is positioned between the lap portion and the seat, such that movement of the waist of the occupant away from the seat is constrained by the lap portion, and such that at least one shoulder of the occupant is between the sash portion and the seatback of the seat, such that movement of the torso of the occupant away from the seatback is constrained by the sash portion.

Some examples of the seatbelt system may result in increasing the likelihood that a vehicle occupant wears a seatbelt. For example, the seatbelt system, in some examples, may not only detect that an occupant has coupled a seatbelt coupling, but may also detect whether the seatbelt is being properly worn by the occupant, for example, so that the seatbelt will protect the occupant as intended in the event of a collision.

In some examples, the seatbelt system may also include a motor coupled to the reel and configured to tighten the belt portion. The occupant detector may be configured to determine, when the belt portion is tightened, based at least in part on the signals indicative of tension and the signals indicative of the length, whether the occupant is properly wearing the seatbelt. For example, the coupling may be configured to provide selective engagement between the belt portion and the portion of the vehicle to which the coupling is coupled, and the motor may be configured to cause the reel to retract the lap portion and/or the sash portion upon engagement between the belt portion and the portion of the vehicle. In some examples, when the occupant deploys a portion of seatbelt (e.g., a portion of the sash portion from the reel) and couples the seatbelt, a motor coupled to the reel may be configured to pull the sash portion such that tension is created at the coupling and/or in the lap portion and/or the sash portion of the seatbelt, and the occupant detector may use the signals indicative of tension and the signals indicative of the length to determine whether the occupant is properly wearing the seatbelt. For example, the reel may receive at least a portion of the sash portion (e.g., at least a portion of the sash portion may be coiled around the reel). In some examples, the deployment sensor may be associated with the sash portion and may be configured to generate signals indicative of the length of the sash portion deployed from the reel. In some examples, the tension sensor may be configured to generate signals indicative of tension in the sash portion. Alternatively, or in addition, the deployment sensor may be associated with the lap portion and may be configured to generate signals indicative of the length of the lap portion deployed from the reel. In addition, the tension sensor may be configured to generate signals indicative of tension in the lap portion.

In some examples, the motor may be further configured to generate additional tension for a predetermined time based at least in part on the occupant detector determining whether the occupant is properly wearing the seatbelt and an output of an event sensor. In some examples, the event sensor may be configured to determine one or more of the occupant first entering the vehicle, a probability of a collision involving the vehicle, or arrival of the vehicle at a destination.

In some examples, the seatbelt system may also include a transmitter associated with the sash portion and configured to transmit signals, and a signal receiver configured to be associated with a portion of the vehicle and receive the signals transmitted by the transmitter. In such examples, the occupant detector may be configured to receive signals from the signal receiver and determine whether the occupant is properly wearing the seatbelt based in part on the signals received from the signal receiver. In some examples, the transmitter may be a wireless transmitter, such as, for example, a radio frequency transmitter (or any other type of wireless transmitter), and the signal receiver may be configured to receive signals from the transmitter. In some examples, the seatbelt system (e.g., the occupant detector) may be configured to determine the location of the transmitter relative to the vehicle and/or the vehicle seat. Based on the determined location, the occupant detector may be configured to determine whether, for example, the lap portion or the sash portion is properly positioned over the occupant's respective lap and shoulder (e.g., rather than under the occupant or behind the occupant's shoulder between the occupant and the seatback).

In some examples, the occupant detector may be configured to generate signals indicative of whether the seatbelt is being properly worn by the occupant, and the seatbelt system may also include a motion controller configured to prevent motion of the vehicle and/or cause the vehicle to exit a road and stop, for example, based at least in part on the signals indicative of whether the seatbelt is being properly worn by the occupant. For example, if the occupant detector determines that the seatbelt is not being worn, or is being worn improperly, the occupant detector may generate signals providing an indication of the occupant not properly wearing the seatbelt. Such signals may be received by the motion controller, and the motion controller may either (1) prevent the vehicle from moving if the vehicle is not already moving, or (2) cause the moving vehicle to maneuver out of the road and slow to a stop. Other possible vehicle actions resulting from not properly wearing the seatbelt may include, for example, alerting the occupant that the seatbelt is not being properly worn, charging the occupant a fee for not properly wearing the seatbelt, altering a user profile associated with the occupant in a manner relating to failure to properly wear the seatbelt, cause the vehicle to travel more slowly until the occupant properly wears the seatbelt.

Some examples of the seatbelt system may also include an imager associated with the vehicle and configured to generate images of the occupant. In some examples, the occupant detector may be configured to determine, based in part on the images, whether the occupant is properly wearing the seatbelt. For example, in addition to receiving the signals indicative of tension in the seatbelt and the signals indicative of the length of the seatbelt deployed, the occupant detector may be configured to use the images to corroborate the determination that was made based on the signals indicative of tension and length.

In some examples, the coupling of the seatbelt system may include a tongue coupled to the lap portion and/or the sash portion, and a receiver configured to be coupled to a portion of the vehicle and selectively engage the tongue, for example, upon buckling the seatbelt. The seatbelt system may also include a coupling sensor configured to generate signals indicative of whether the receiver is engaged with the tongue. In such examples, the occupant detector may be configured to determine, based in part on the signals indicative of whether the receiver is engaged with the tongue, whether the occupant is properly wearing the seatbelt. For example, in addition to receiving the signals indicative of tension in the seatbelt and the signals indicative of the length of the seatbelt deployed, the occupant detector may be configured to use the signals indicative of whether the receiver is engaged with the tongue to corroborate the determination that was made based on the signals indicative of tension and length.

In some examples, the seatbelt system may also include a seat sensor configured to generate signals indicative of whether occupant is sitting in a seat associated with the vehicle. The occupant detector may be configured to determine, based in part on the signals indicative of whether the occupant is sitting in the seat and/or properly wearing the seatbelt. For example, the seat sensor may include a pressure sensor, and the occupant detector may be configured to estimate the size and/or weight of the occupant based on the seat sensor signals, and the size/weight estimation may be used in combination with other information to estimate whether the seatbelt is being properly worn by the occupant.

In some examples, the vehicle may include an airbag system configured to deploy one or more airbags in response to predicting and/or sensing a collision involving the vehicle. In some examples, the airbag system may be configured to alter the deployment rate of the airbag and/or the deployment volume (or pressure) of the airbag based on whether an occupant of the vehicle is properly wearing the seatbelt. In such examples, the occupant detector may be configured to generate signals indicative of whether the occupant is properly wearing the seatbelt, and the airbag system may receive those signals and alter the deployment rate of the airbag and/or the deployment volume (or pressure) of the airbag based on whether an occupant of the vehicle is properly wearing the seatbelt.

The techniques and systems described herein may be implemented in a number of ways. Example implementations are provided below with reference to the figures.

FIG. 1 is a perspective view of an interior 100 of a vehicle 102 including an occupant 104 wearing an example seatbelt 106 of an example seatbelt system 108. The example vehicle 102 may be configured to travel via a road network from one geographic location to a destination carrying the occupant 104, and in some instances, other occupants. For example, the interior 100 may include a plurality of seats 110, which may be provided in any relative arrangement. For example, the vehicle 102 may include two or more rows 112 of seats 110. In some examples, two of the rows 112 of seats 110 may face each other. In the example shown, the row 112 of seats includes two seats 110, each of which includes a seat portion 114 configured to support the majority of the weight of the occupant 104, and a seatback 116 associated with the seat portion 114 and configured to support the back of the occupant 104. Other relative arrangements and numbers of seats 110 are contemplated.

For the purpose of illustration, the vehicle 102 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 102 may be configured to control all functions from start to completion of the trip, including all parking functions, it may not include a driver. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 102 may be any configuration of vehicle, such as, for example, a van, a sport utility vehicle, a cross-over vehicle, a truck, a bus, an agricultural vehicle, and a construction vehicle. The vehicle 102 may be powered by one or more internal combustion engines, one or more electric motors, hydrogen power, any combination thereof, and/or any other suitable power sources. In addition, the example vehicle 102 may include any number of wheels, tires, and/or tracks, such as, for example, four wheels.

In the example shown in FIG. 1, the seatbelt system 108 includes the seatbelt 106, which may include a belt portion 118 that may include a lap portion 120 configured to constrain the waist 122 of the occupant 104, and a sash portion 124 configured to constrain the torso 126 of the occupant 104. The example seatbelt system 108 also includes a coupling 128 configured to be coupled to a portion of the vehicle 102 and one or more of the lap portion 120 and the sash portion 124. For example, the coupling 128 may be coupled via a strap, cable, or belt to the chassis (or another portion) of the vehicle 102, either directly or indirectly. In some examples, the lap portion 120 may include one end coupled to a portion of the vehicle 102 (e.g., to the chassis or another portion of the vehicle 102) and a second end coupled to the coupling 128. In some examples, the sash portion 124 may include one end coupled to the coupling 128 and another end coupled to a portion of the vehicle 102, for example, as shown in FIG. 1.

FIG. 1 shows an example occupant 104 depicted properly wearing the seatbelt 106, for example, such that the lap portion 120 and the sash portion 124 constrain the occupant in the event of a collision involving the vehicle 102. For example, the occupant 104 may properly wear the seatbelt 106 when the occupant 104 is seated upright in the seat 110 associated with the seatbelt 106, with the coupling 128 providing engagement between the seatbelt 106 and a portion of the vehicle 102, with the waist 122 of the occupant 104 being positioned between the lap portion 120 and the seat 110, such that movement of the waist 122 of the occupant 104 away from the seat 110 is constrained by the lap portion 120, and such that at least one shoulder of the occupant 104 is between the sash portion 124 and the seatback 116 of the seat 110, such that movement of the torso 126 of the occupant 104 away from the seatback 116 is constrained by the sash portion 124.

Figure 2:
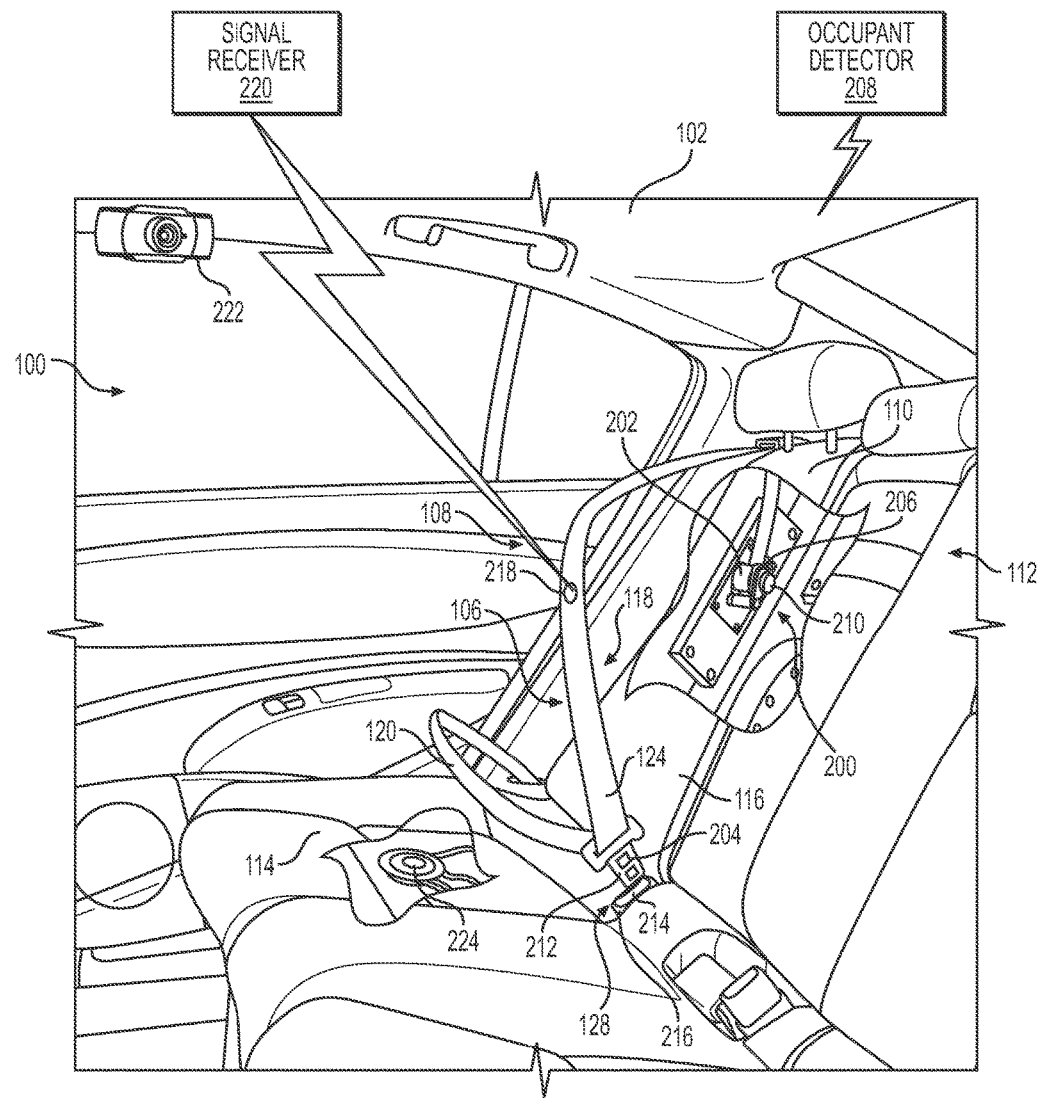
FIG. 2 is a perspective, partial cutaway view of the example seatbelt and seatbelt system shown in FIG. 1.

As shown in FIG. 2, the example seatbelt system 108 may also include a belt payout system 200, which may include a reel 202 configured to receive at least a portion of the belt portion 118. For example, as shown in FIG. 2, the reel 202 receives at least a portion of the sash portion 124. In some examples, the reel 202 may be configured to receive at least a portion of the lap portion 120. The reel 202 may include a spool about which a portion of one end of the belt portion 118 is wrapped. As explained herein, the belt portion 118 may be deployed and retracted via the reel 202.

The example seatbelt system 108 shown in FIG. 2 also includes a tension sensor 204 configured to generate signals indicative of tension in the lap portion 120 and/or the sash portion 124. For example, the tension sensor 204 shown in FIG. 2 is coupled to the coupling 128 and is configured to generate signals indicative of the tension in the lap portion 120 and/or the sash portion 124. In some examples, the tension sensor 204 may be coupled to the sash portion 124, the lap portion 120, or the reel 202, either directly or indirectly. The tension sensor 204 may be any type of transducer configured to generate signals indicative of tensile stress, such as, for example, a load cell or a strain gauge.

In some examples, the seatbelt system 108 may also include a deployment sensor 206 configured to generate signals indicative of the length of the lap portion 120 or the sash portion 124 deployed from the reel 202. The deployment sensor 206 may be associated with the lap portion 120 and/or the sash portion 124, either directly or indirectly. The deployment sensor 206 may include any type of transducer configured to generate signals indicative of the length of the lap portion 120 or sash portion 124 deployed from the reel 202, for example, relative to a substantially or completely retracted condition of the belt portion 118 on the reel 202 when the seatbelt 106 is not in use.

As shown in FIG. 2, the seatbelt system 108 may also include an occupant detector 208 in communication with the tension sensor 204 and the deployment sensor 206, and configured to determine, based at least in part on the signals indicative of tension and the signals indicative of the length, whether an occupant 104 is properly wearing the seatbelt 106, such that the lap portion 120 and the sash portion 124 constrain the occupant 104. For example, the occupant detector 208 may be configured to determine, based at least in part on the tension in the seatbelt 106 and the amount of the seatbelt 106 deployed, whether the occupant 104 is properly wearing the seatbelt 106. For example, if there is tension in the seatbelt 106, but the length of the seatbelt 106 deployed is too short to indicate that the occupant is located between the sash portion 124 and the seatback 116, then the occupant detector 208 may determine that the seatbelt 106 is not being properly worn by the occupant 104. For example, the occupant 104 may be wearing the seatbelt such that the sash portion 124 is between the occupant 104 and the seatback 116, such that in the event of a collision involving the vehicle 102, the sash portion 124 would not constrain the torso 126 of the occupant 104. Alternatively, if there is insufficient or no tension in the seatbelt 106, but the seatbelt 106 is deployed a length consistent with the occupant wearing the seatbelt 106, it may be an indication that the seatbelt 106 is being worn too loosely to provide protection to the occupant 104 in the event of a collision involving the vehicle 102. In some examples, the combination of the signals indicative of tension and the signals indicative of deployment may be used to determine whether the occupant 104 is properly wearing the seatbelt 106.

In some examples, the belt payout system 200 of the seatbelt system 108 may also include a motor 210 coupled to the reel 202 and configured to tighten the belt portion 118, for example, as shown in FIG. 2. The motor 210 may be any type of motor, such as an electric motor. Other types of motors are contemplated. In some examples, the occupant detector 208 may be configured to determine, when the belt portion 118 is tightened via the motor 210, based at least in part on the signals indicative of tension and the signals indicative of the length, whether the occupant 104 is properly wearing the seatbelt 106. For example, the motor 210 may be configured to tighten the lap portion 120 and/or the sash portion 124 following deployment of the belt portion 118, and the occupant detector 208 may determine whether the occupant 104 is properly wearing the seatbelt 106 based on the signals indicative of tension and the signals indicative of the length of deployment, for example, as described herein.

Figure 3:
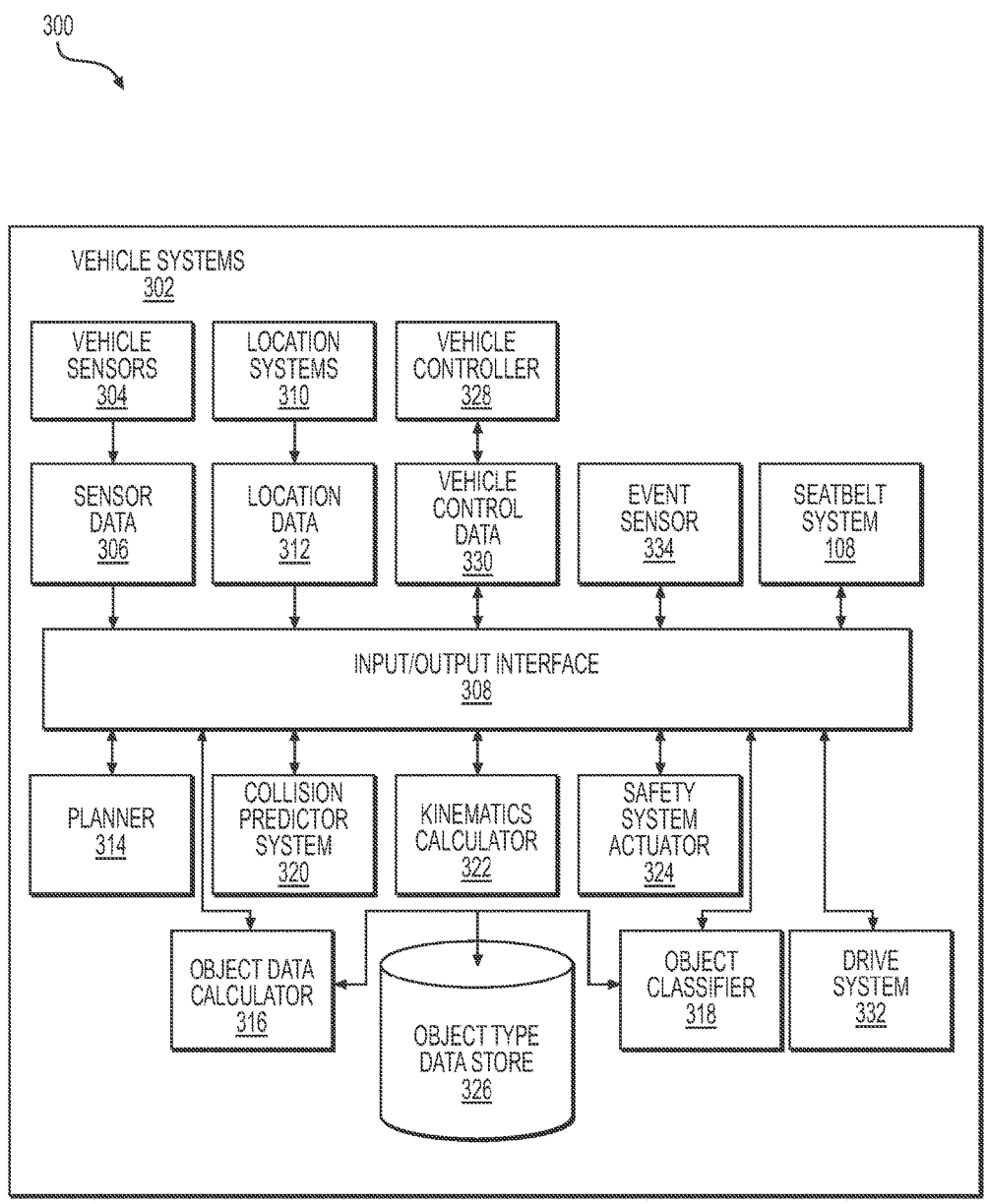
FIG. 3 is a block diagram of an example vehicle systems architecture.

In some examples, the motor 210 may be configured to generate additional tension for a predetermined period of time (e.g., up to thirty seconds) based at least in part on the occupant detector 208 determining whether the occupant 104 is properly wearing the seatbelt 106 and an output of an event sensor (see FIG. 3). For example, the event sensor may be configured to determine when the occupant 104 first enters the vehicle 102, determine a probability of a collision involving the vehicle 102, and/or determine arrival of the vehicle 102 at a destination. Other types of events are contemplated. In some examples, the additional tension may not be constant in nature. For example, the additional tension may repeatedly increase and relax over the predetermined time period, for example, such that the level of tension approximates a sine wave or similar function, the level of tension pulses, the level of tension follows a code (e.g., Morse code), or level of tension changes according to any other period or non-periodic pattern.

In some examples, the coupling 128 may be configured to provide selective engagement between the belt portion 118 and the portion of the vehicle 102 to which the coupling 128 is coupled. The motor 210 may be configured to cause the reel 202 to retract the lap portion 120 and/or the sash portion 124 upon engagement between the belt portion 118 and the portion of the vehicle 102.

For example, as shown in FIG. 2, the coupling 128 may include a tongue 212 coupled to the lap portion 120 and/or the sash portion 124, and a receiver 214 configured to be coupled to a portion of the vehicle 102 and selectively engage the tongue 212. In some examples, the seatbelt system 108 may include a coupling sensor 216 configured to generate signals indicative of whether the receiver 214 is engaged with the tongue 212. The coupling sensor 216 may be any type of sensor configured to generate signals indicative of engagement between the tongue 212 and the receiver 214. In some examples, the occupant detector 208 may be configured to determine, based in part on the signals indicative of whether the receiver 214 and the tongue 212 are engaged with one another, whether the occupant 104 is properly wearing the seatbelt 106. For example, signals generated by the coupling sensor 216 may confirm that the coupling 128 has been properly engaged, and the signals indicative of tension and length of deployment may confirm that the seatbelt 106 is properly deployed to constrain the occupant 104 in the event of a collision involving the vehicle 102.

As shown in FIG. 2, some examples of the seatbelt system 108 may also include a transmitter 218 associated with the lap portion 120 and/or the sash portion 124 and configured to transmit signals, and a signal receiver 220 configured to be associated with a portion of the vehicle 102 and receive the signals transmitted by the transmitter 218. For example, the transmitter 218 may be any type of wireless transmitter, such as, for example, a transmitter operating according to the BLUETOOTH® protocol, one or more active RFID tags, one or more LEDs having a wavelength that may or may not be visible to the human eye, or the like. Other types of wireless transmitters are contemplated, such as, for example, thermal sensors having a transmitter function or other transmitter types that transmit signals to facilitate determining the location of the transmitter based on the signals. In some examples, the transmitter 218 may be passive. As non-limiting examples, the transmitter 218 may be one or more passive RFID tags, a coating absorptive or reflective for a particular wavelength of light at least coating a portion of the lap portion 220 and/or the sash portion 124, for example, such that light of that wavelength reflected off of the lap portion 120 and/or the sash portion 124 is detected or not detected at the signal receiver 220, based on the reflective or absorptive property, or the like. The signal receiver 220 may be any type of signal receiver configured to receive signals from the transmitter 218 and in some examples, determine the location of the transmitter 218 based on the signals. In some examples, the occupant detector 208 may be configured to receive signals from the signal receiver 220 and determine whether the occupant 104 is properly wearing the seatbelt 106 based in part on the signals received from the signal receiver 220. For example, the signal receiver 220 and/or the occupant detector 208 may be configured to determine the location of the transmitter 218 within the interior 100 of the vehicle 102 based on, for example, the signal strength of the signals received from the transmitter 218. Based at least in part on the location of the transmitter 218, the occupant detector 208 may be configured to determine whether the occupant 104 is properly wearing the seatbelt 106, for example, by determining whether the location of the transmitter 218, which may be coupled to the sash portion 124, is consistent with the occupant 104 being between the sash portion 124 and the seatback 116. In some examples, the seat 110 and/or the seatback 116 may be moveable relative to the interior 100 of the vehicle 102, and the occupant detector 208 may be configured to account for different locations of the seat 110 and/or seatback 116 when determining whether the transmitter 218 is in a location consistent with the occupant 104 being between the sash portion 124 and the seatback 116.

As shown in FIG. 2, some examples of the seatbelt system 108 may also include one or more imagers 222 associated with the interior 100 of the vehicle 102 and configured to generate images of the occupant 104 (e.g., images of the belt portion 118 and the occupant 104). In some such examples, the occupant detector 208 may be configured to determine, based in part on the images, whether the occupant 104 is properly wearing the seatbelt 106. For example, the occupant detector 208 may receive the images and via, for example, image analysis techniques, determine whether the seatbelt 106 positioned relative to the occupant 104 in a manner consistent with the occupant 104 properly wearing the seatbelt 106. For example, if the sash portion 124 is not in the one or more images, it may be an indication that the occupant 104 is sitting in front of the sash portion 124, such that the sash portion 124 is located between the occupant 104 and the seatback 116, so that the sash portion 124 will not constrain movement of the torso 126 of the occupant during a collision involving the vehicle 102. In some examples, the lap portion 120 and/or the sash portion 124 may include one or more materials, stitching, embroidery, one or more infrared transmitters, and/or one or more coatings that facilitate detection in the images by the imager 222, so that the occupant detector 208 may more easily determine whether the lap portion 120 and/or the sash portion 124 are positioned relative to the occupant 104 in a manner consistent with the occupant 104 properly wearing the seatbelt 106.

As shown in FIG. 2, the example seatbelt system 108 may also include a seat sensor 224 configured to generate signals indicative of whether the occupant 104 is sitting in a seat 110 associated with the interior 100 of the vehicle 102. In some such examples, the occupant detector 208 may be configured to determine, based in part on the signals indicative of whether the occupant 104 is sitting in the seat 110, whether the occupant 104 is present in the seat 110 and/or whether the occupant 104 is properly wearing the seatbelt 106. The seat sensor 224 may be any type of sensor for determining whether the occupant 104 is sitting in the seat 110, such as, for example, a pressure sensor. In some examples, the occupant detector 208 may be configured to receive the signals indicative of whether the occupant 104 is sitting in the seat 110, and may estimate physical attributes of the occupant 104, such as the weight and/or height of the occupant 104. The physical attributes may be compared to the signals indicative of the tension in the lap portion 120 and/or sash portion 124 and/or the signals indicative of the length of deployment of the lap portion 120 and/or sash portion 124 to determine whether the physical attributes are consistent with the signals, for example, when the seatbelt 106 is properly worn by the occupant 104.

FIG. 3 is a block diagram of an example architecture 300 including vehicle systems 302 for controlling operation of the systems that provide data associated with operation of the vehicle 102, and that control operation of the vehicle 102. In various implementations, the architecture 300 may be implemented using a uniprocessor system including one processor, or a multiprocessor system including several processors (e.g., two, four, eight, or another suitable number). The processor(s) may be any suitable processor capable of executing instructions. For example, in various implementations, the processor(s) may be general-purpose or embedded processors implementing any of a variety of instruction set architectures (ISAs), such as the x86, PowerPC, SPARC, or MIPS ISAs, or any other suitable ISA. In multiprocessor systems, each processor may commonly, but not necessarily, implement the same ISA. In some examples, the processor(s) may include a central processing unit (CPU), a graphics processing unit (GPU), or a combination thereof.

The example architecture 300 may include a non-transitory computer readable media configured to store executable instructions/modules, data, and/or data items accessible by the processor(s). In various implementations, the non-transitory computer readable media may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, and/or data may be received, sent, or stored on different types of computer-accessible media, such as non-transitory media, or on similar media separate from the non-transitory computer readable media. Generally speaking, a non-transitory, computer readable memory may include storage media or memory media, such as flash memory (e.g., solid state memory), magnetic or optical media (e.g., a disk) coupled to the architecture 300 via an I/O interface. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via a network interface.

In some implementations, the I/O interface may be configured to coordinate I/O traffic between the processor(s), the non-transitory computer readable media, and any peripheral devices, the network interface, or other peripheral interfaces, such as input/output devices. In some implementations, the I/O interface may perform any necessary protocol, timing, or other data transformations to convert data signals from one component (e.g., the non-transitory computer readable media) into a format suitable for use by another component (e.g., processor(s)). In some implementations, the I/O interface may include support for devices attached through various types of peripheral buses, such as a variant of the Peripheral Component Interconnect (PCI) bus standard or the Universal Serial Bus (USB) standard, for example. In some implementations, the function of the I/O interface may be split into two or more separate components, such as a north bridge and a south bridge, for example. Also, in some implementations, some or all of the functionality of the I/O interface, such as an interface to the non-transitory computer readable media, may be incorporated directly into the processor(s).

In the example architecture 300 shown in FIG. 3, the example vehicle systems 302 include a plurality of vehicle sensors 304, for example, configured to sense movement of the vehicle 102 through the environment, sense environmental data, such as the ambient temperature, pressure, and humidity, and/or sense objects in the environment surrounding the vehicle 102. In some examples, the vehicle sensors 304 may include sensors configured to identify a location on a map. The vehicle sensors 304 may include, for example, one or more light detection and ranging sensors (LIDAR), one or more cameras, one or more radio detection and ranging sensors (RADAR), one or more sound navigation and ranging sensors (SONAR), one or more microphones for sensing sounds in the environment, such as sirens from law enforcement and emergency vehicles, and other sensors related to the operation of the vehicle 102. Other sensors may include a speed sensor, sensors related to operation of internal combustion engines and/or electric motors, sensors related to the tires to detect tire temperature, tire pressure, and tread depth, and/or brake-related sensors for detecting brake temperatures and/or wear, and in vehicles having regenerative braking, sensors for detecting parameters related to operation of the regenerative braking system. The vehicle sensors 304 may also include, for example, inertial measurement units (IMUs), accelerometers, and gyroscopes. The vehicle sensors 304 may be configured to provide sensor data 306 representative of the sensed objects and signals to the vehicle systems 302 via, for example, an input/output (I/O) interface 308. Other types of sensors and sensor data are contemplated.

The example vehicle systems 302 also include location systems 310 configured to receive location information, including position and orientation data (e.g., a local position or local pose) from the vehicle sensors 304 and/or external sources, and provide location data 312 to other portions of the vehicle systems 302 via the I/O interface 308. The external sources may include global satellites for facilitating operation of a global positioning system (GPS) and/or a wireless network for communicating and receiving information related to the vehicle's location, such as map data. The location systems 310 may also include sensors configured to assist with navigation of the vehicle 102, such as wheel encoders for sensing the rotation of the wheels, inertial navigation sensors, such as gyroscopes and/or accelerometers, and/or cameras for obtaining image data for dead-reckoning navigation.

The example vehicle systems 302 may also include one or more of a planner 314, an object data calculator 316, an object classifier 318, a collision predictor system 320, a kinematics calculator 322, and a safety system actuator 324. The vehicle systems 302 may be configured to access one or more data stores including, but not limited to, an object type data store 326. The object type data store 326 may include data representing object types associated with object classifications for objects detected in the environment.

The example vehicle systems 302 shown in FIG. 3 also include a vehicle controller 328 configured to receive vehicle control data 330, and based on the vehicle control data 330, communicate with a drive system 332 (e.g., a steering system, a propulsion system, suspension system, and/or a braking system) to control operation of the vehicle 102. For example, the vehicle control data 330 may be derived from data received from one or more of the vehicle sensors 304 and one or more of the planner 314, the object data calculator 316, the object classifier 318, the collision predictor system 320, the kinematics calculator 322, and the safety system actuator 324, and control operation of the drive system 332, so that operation and maneuvering of the vehicle 102 is executed.

In some examples, the planner 314 may be configured to generate data representative of a trajectory of the vehicle 102, for example, using data representing a location of the vehicle 102 in the environment and other data, such as local pose data, that may be included in the location data 312. In some examples, the planner 314 may also be configured to determine projected trajectories predicted to be executed by the vehicle 102. The planner 314 may, in some examples, be configured to calculate data associated with a predicted motion of an object in the environment, and may determine a predicted object path associated with the predicted motion of the object. In some examples, the object path may include the predicted object path. In some examples, the object path may include a predicted object trajectory. In some examples, the planner 314 may be configured to predict more than a single predicted object trajectory. For example, the planner 314 may be configured to predict multiple object trajectories based on, for example, probabilistic determinations or multi-modal distributions of predicted positions, trajectories, and/or velocities associated with an object.

In some examples, the object data calculator 316 may be configured to provide data representative of, for example, one or more of the location and/or pose (i.e., position and orientation) of an object in the environment surrounding the vehicle 102, an object track (e.g., an historical record of previous locations and/or poses) associated with the object, and an object classification associated with the object. For example, the object data calculator 316 may be configured to receive data in the form of sensor signals received from one or more of the vehicle sensors 304 and determine data representing one or more of the location in the environment of the object, the object track, and the object classification.

In some examples, the object classifier 318 may be configured to access data from the object type data store 326, which may be configured to store data representing object types, such as, for example, a species of an object classification, a subclass of an object classification, and/or a subset of an object classification. The object classifier 318, in some examples, may be configured to analyze data representing an object track and data representing an object classification with data representing an object type, and determine an object type based at least in part on the object track and classification data. For example, a detected object having an object classification of an "automobile" may have an object type of "sedan," "coupe," "hatch-back," "sports utility vehicle," "pick-up truck," or "minivan." An object type may include additional subclasses or subsets. For example, a "sedan" that is parked may have an additional subclass designation of being "static" or "being dynamic" if moving.

In some examples, the collision predictor system 320 may be configured to use the data representing the object type, the data representing the trajectory of the object, and/or the data representing the trajectory of the vehicle 102, to predict a collision between the vehicle 102 and the object.

In some examples, the kinematics calculator 322 may be configured to determine data representing one or more scalar and/or vector quantities associated with motion of objects in the environment, including, but not limited to, velocity, speed, acceleration, deceleration, momentum, local pose, and/or force. Data from the kinematics calculator 322 may be used to compute other data, including, but not limited to, data representing an estimated time to impact between an object and the vehicle 102, and data representing a distance between the object and the vehicle 102. In some examples, the kinematics calculator 322 may be configured to predict a likelihood that other objects in the environment (e.g., cars, motorcyclists, pedestrians, cyclists, and animals) are moving in an alert or controlled state, versus an un-alert or uncontrolled state. For example, the kinematics calculator 322 may be configured estimate the probability that other objects are moving as though they are being controlled and/or are behaving in a predictable manner, or whether they are not being controlled and/or behaving in an unpredictable manner, for example, by observing motion of the object over time and relative to other objects in the environment. For example, if the objects are moving erratically or without appearing to adjust to the presence or motion of other objects in the environment, this may be an indication that the objects are either uncontrolled or moving in an unpredictable manner. This may be inferred based on sensor data received over time that may be used to estimate or predict a future location of the object relative to a current or future trajectory of the vehicle 102.

In some examples, the safety system actuator 324 may be configured to activate one or more safety systems of the autonomous vehicle 102 when a collision is predicted by the collision predictor 320 and/or the occurrence of other safety related events, such as, for example, an emergency maneuver by the vehicle 102, such as hard braking or a sharp acceleration. The safety system actuator 324 may be configured to activate an interior safety system (e.g., including activating the motor 210 to provide pre-tension in the seatbelt 106 and/or activating airbags), an exterior safety system (e.g., including warning sounds and/or warning lights), the drive system 332, which may be configured to execute an emergency maneuver to avoid a collision, and/or any combination thereof. For example, the drive system 332 may receive data for causing a steering system of the vehicle 102 to change the travel direction of the vehicle 102, and a propulsion system of the vehicle 102 to change the speed of the vehicle 102 to alter the trajectory of vehicle 102 from an initial trajectory to a trajectory for avoiding a collision.

The vehicle systems 302 may operate according to the following example. Data representing a trajectory of the vehicle 102 in the environment may be received by the vehicle controller 328. Object data associated with an object in the environment may be calculated. Sensor data 306 from one or more of the vehicle sensors 304 may be used to calculate the object data. The object data may include data representing the location of the object in the environment, an object track associated with the object, such as whether the object is stationary or moving, and an object classification associated with the object, such as whether the object is another vehicle, a pedestrian, a cyclist, an animal, or a stationary object. In some examples, the object data calculator 316, based on the object data, may be used to determine data representing the object's location in the environment, data representing whether the object is moving, and data representing a classification associated with the object.

In some examples, the planner 314 may use the object data to determine a predicted path of the object in the environment, for example, based on data representing the location of the object and may process that data to generate data representing a predicted object path. Data representing the type of object may be determined based on the data representing whether the object is moving, data representing the object's classification, and/or data representing object's type. A pedestrian not in motion, a vehicle in motion, and traffic sign, a lane marker, or a fire hydrant, none of which is in motion, are examples of object types with an associated motion data.

In some examples, the collision predictor system 320 may be used to predict a collision between the vehicle 102 and an object in the environment based on the object type, whether the object is moving, the trajectory of the vehicle 102, the predicted path of the object obtained from the planner 314. For example, a collision may be predicted based in part on the object type due to the object moving, the trajectory of the object being in potential conflict with the trajectory of the vehicle 102, and the object having an object classification that indicates the object is a likely collision threat.

In some examples, the safety system actuator 324 may be configured to actuate one or more portions of a safety system of the vehicle 102 when a collision is predicted. For example, the safety system actuator 324 may activate one or more safety systems of the vehicle 102, such as, for example, one or more of the interior safety systems, one or more of the exterior safety systems, and one or more of the components of the drive system 332 (e.g., the steering system, the propulsion system, and/or the braking system) via the vehicle controller 328. In some examples, the vehicle controller 328 may determine that the interior safety system will be activated based on some action of an object in the environment, and the vehicle control data 330 may include information configured to cause the vehicle controller 328 to activate one or more functions of the interior safety system, the exterior safety system, and the drive system 332.

In some examples, the vehicle systems 302 may also include an event sensor 334. For example, the event sensor 334 may be configured to receive signals from one or more of the other vehicle systems 302 and determine whether events that may be related to operation of the seatbelt system 108 are occurring. For example, the event sensor 334 may be configured to determine when the occupant 104 first enters the vehicle 102, determine a probability of a collision involving the vehicle 102, and/or determine arrival of the vehicle 102 at a destination. In some examples, the event sensor 334 may communicate with the seatbelt system 108 via, for example, the input/output interface 308. For example, the event sensor 334 may communicate with the motor 210 (FIG. 2) of the seatbelt system 108, which may be configured to generate additional tension in the seatbelt 106 for a predetermined period of time (e.g., up to thirty seconds) based at least in part on the occupant detector 208 determining whether the occupant 104 is properly wearing the seatbelt 106 and the output of an event sensor 334, for example, as described herein. Other types of events are contemplated.

As shown in FIG. 3, the example vehicle systems 302 also include the seatbelt system 108, which may operate as described herein. In some examples, the seatbelt system 108 may be in communication with other vehicle systems 302 via the input/output interface 308. For example, the seatbelt system 108 may be in communication with the safety system actuator 324, the vehicle control data 330, and/or the vehicle controller 328, for example, as described herein.

Figure 4:
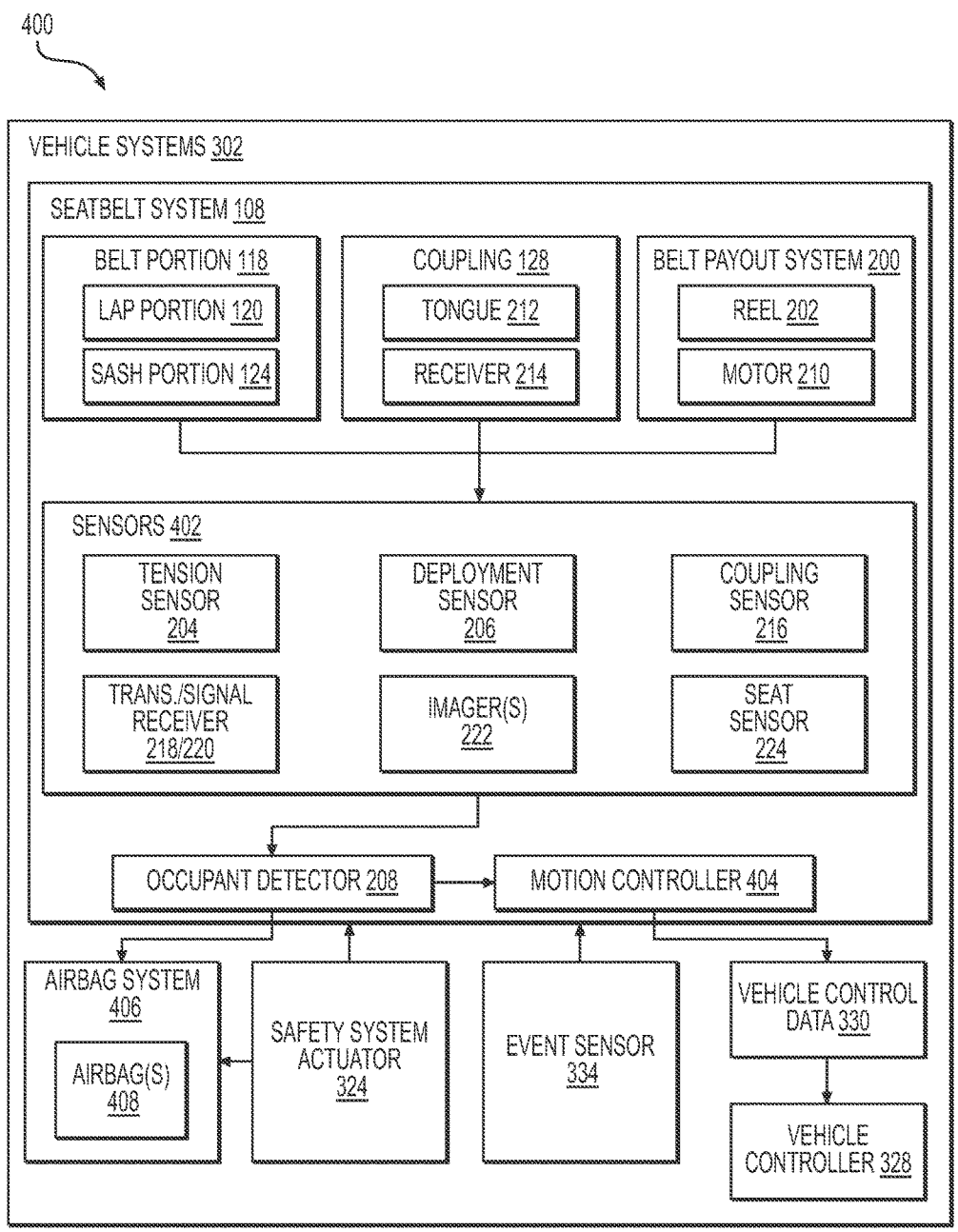
FIG. 4 is a block diagram including an example vehicle systems architecture showing an example seatbelt system architecture.

FIG. 4 shows an example architecture 400 including the vehicle systems 302 and the seatbelt system 108. In the example shown, the seatbelt system 108 includes the belt portion 118, which includes the lap portion 120 and the sash portion 124. The example seatbelt system 108 also includes the coupling 128, which includes the tongue 212 and the receiver 214, and the belt payout system 200, which includes the reel 202 and the motor 210. The example, seatbelt system 108 also includes the sensors 402 related to operation of the seatbelt system 108. In the example shown, the sensors 402 include the tension sensor 204 and the deployment sensors 206. In some examples, the sensors 402 may also include the coupling sensor 216, the combination transmitter 218 and signal receiver 220, the imager(s) 222, and the seat sensor 224.

In the example shown, the seatbelt system 108 also includes an occupant detector 208. The occupant detector 208 may be configured to receive signals from one or more of the sensors 402 and determine whether the occupant 104 is wearing the seatbelt 106 properly, for example, as described herein. In some examples, the occupant detector 208 may be configured to generate signals indicative of whether the seatbelt 106 is being properly worn by the occupant 104, and the seatbelt system 108 may also include a motion controller 404 configured to prevent motion of the vehicle 102 and/or or cause the vehicle 102 to exit the road and stop, for example, based at least in part on the signals indicative of whether the seatbelt 106 is being properly worn by the occupant 104. For example, if the occupant detector 208 determines that the seatbelt 106 is not being properly worn by the occupant 104, the motion controller 404 may communicate with the vehicle systems 302, for example, such that the signals are communicated to the vehicle control data 330, and the vehicle controller 328 (1) prevents the vehicle 102 from moving if the vehicle 102 is already stopped, or (2) if the vehicle 102 is already moving, causes the vehicle 102 to pull-off the road and stop in a safe location. In some examples, such a procedure to pull-off the road comprises continuing to operate the vehicle in an autonomous mode, navigating traffic, to a location where the vehicle may safely stop. This may prevent the vehicle 102 from operating unless one, some, or all occupants of the vehicle 102 are wearing their respective seatbelts 106 properly.

As noted herein, in some examples, the seatbelt system 108 may be configured to receive signals from the safety system actuator 324 and/or the event sensor 334 and respond to those signals accordingly. For example, the safety system actuator 324 may receive signals from one or more of the vehicle systems 302 indicating an imminent possible collision involving the vehicle 102. In some examples, the seatbelt system 108 may be configured to activate the motor 210 to apply a pre-tension to the seatbelt 106, thereby more securely constraining the occupant 104 when/if the vehicle 102 collides with another object. In some examples, the event sensor 334 may be configured to receive signals from one or more of the other vehicle systems 302 and determine whether events that may be related to operation of the seatbelt system 108 are occurring. For example, the event sensor 334 may be configured to determine when the occupant 104 first enters the vehicle 102, determine a probability of a collision involving the vehicle 102, and/or determine arrival of the vehicle 102 at a destination. In some examples, the event sensor 334 may communicate with the motor 210 of the seatbelt system 108, which may be configured to generate additional tension in the seatbelt 106 for a predetermined period of time (e.g., up to thirty seconds) based at least in part on the occupant detector 208 determining whether the occupant 104 is properly wearing the seatbelt 106 and the output of an event sensor 334. In some examples, the motor 210 may tension the seatbelt 106 to notify the occupant 104 of the event. Other types of events are contemplated.

As shown in FIG. 4, some examples of the vehicle systems 302 also include an airbag system 406 including at least one airbag 408 configured to deploy prior to or during a collision involving the vehicle 102. In some such examples, the occupant detector 208 may be configured to generate signals indicative of whether the seatbelt 106 is being properly worn by the occupant 104. In some examples, these signals may be communicated to the airbag system 406, and the airbag system 406 may be configured to alter the rate of deployment and/or the volume (or pressure) of deployment of the airbag 408 based at least in part on the signals indicative of whether the seatbelt 106 is being properly worn by the occupant 104. For example, if the occupant detector 208 determines that the occupant 104 is properly wearing the seatbelt 106, the rate of deployment and/or the volume of deployment of the airbag 408 may be reduced relative to the rate and/or volume of deployment of the airbag 408 when the occupant detector 208 determines that the occupant 104 is not wearing the seatbelt 106 properly. In some examples, this may reduce the likelihood of injury to the occupant 104 when the occupant 104 is wearing the seatbelt 106 properly, and/or may provide additional protection for an occupant 104 when the occupant is not wearing the seatbelt 106 properly.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Those skilled in the art will appreciate that the example architectures 300 and 400 are merely illustrative and are not intended to limit the scope of the present disclosure. In particular, the computing system and devices may include any combination of hardware or software that can perform the indicated functions, including computers, network devices, internet appliances, tablet computers, PDAs, wireless phones, pagers, etc. The architectures 300 and 400 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated architectures 300 and 400. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the architectures 300 and 400 may be transmitted to the architectures 300 and 400 via transmission media or signals such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations. Additional information about the operations of the modules of the vehicle 102 is discussed below.

Figure 5:
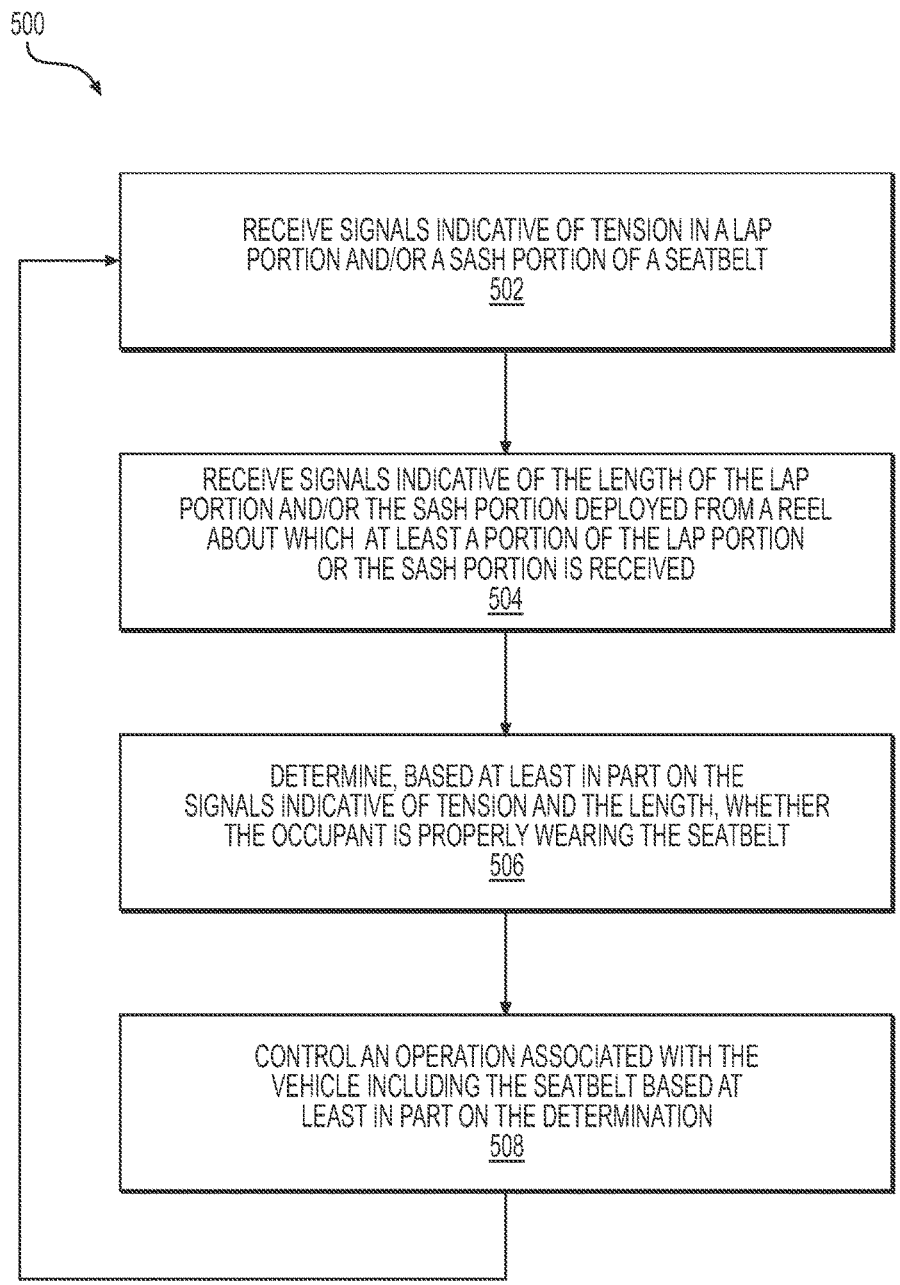
FIG. 5 is a flow diagram of an example process for controlling operation associated with a vehicle including a seatbelt system.

FIG. 5 is a flow diagram of an example process illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 5 is a flow diagram of an example process 500 for controlling operation associated with a vehicle including a seatbelt system. At 502, the example process 500 may include receiving signals indicative of tension in a lap portion and/or a sash portion of a seatbelt. In some examples, the signals indicative of tension may be generated by a tension sensor, and the signals may be received by an occupant detector, for example, as described herein.

At 504, the example process 500 may include receiving signals indicative of a length of the lap portion or the sash portion deployed from a reel about which at least a portion of the lap portion or the sash portion is received. For example, the lap portion or the sash portion may be received by a reel about which the lap portion or the sash portion is wrapped. When the seatbelt is used by an occupant of the vehicle, the occupant may pull a length of the seatbelt from the reel in order to place it over the occupant's lap and/or shoulder. In some examples, a deployment sensor generates signals indicative of the length of the seatbelt pulled or deployed from the reel, and an occupant detector will receive those signals, for example, as described herein.

At 506, the example process 500 may include determining, based at least in part on the signals indicative of tension and the signals indicative of the length, whether an occupant is properly wearing the seatbelt, such that the lap portion and the sash portion constrain the occupant. For example, the signals may be received by an occupant detector, and the occupant detector may determine whether the occupant is properly wearing the seatbelt. For example, if there is tension in the seatbelt, but the length of the seatbelt deployed is too short to indicate that the occupant is located between the sash portion and the seatback of the seat in which the occupant is sitting, then the occupant detector may determine that the seatbelt is not being properly worn by the occupant. Alternatively, if there is insufficient or no tension in the seatbelt, but the seatbelt is deployed a length consistent with the occupant wearing the seatbelt, it may be an indication that the seatbelt is being worn too loosely to provide protection to the occupant in the event of a collision involving the vehicle. In this example manner, the combination of the signals indicative of tension and the signals indicative of deployment may be used to determine whether the occupant is properly wearing the seatbelt, for example, as described herein.

In some examples, the process 500 may include receiving signals from a transmitter associated with the lap portion and/or the sash portion of the seatbelt, and determining, based at least in part on the signals received from the transmitter, whether the occupant is properly wearing the seatbelt. For example, the transmitter may generate wireless signals, and a signal receiver and/or the occupant detector may determine the location of the transmitter relative to the interior of the vehicle based at least in part on the signals from the transmitter. Based in part on the location of the transmitter, the occupant detector may determine whether the occupant is properly wearing the seatbelt, for example, as described herein.

In some examples, the example process 500 may include activating a motor associated with the reel to tighten the seatbelt, and determining, when the seatbelt is tightened, whether the occupant is properly wearing the seatbelt based at least in part on the signals indicative of tension and the signals indicative of the length of deployment. For example, the reel may be associated with a motor, the motor may be activated to tighten the seatbelt, and the determination of whether the seatbelt is being properly worn may be made during and/or following the tightening of the seatbelt.

In some examples of the process 500, the seatbelt may include a belt portion and a coupling coupled to the belt portion and to a portion of the vehicle, and the process 500 may include detecting engagement between the belt portion and a portion of the vehicle (e.g., the chassis or a portion of the vehicle associated with the chassis), and activating the motor to cause the reel to retract a portion of the belt portion following detection of the engagement. During activation of the motor and/or thereafter, the process 500 may include determining whether the occupant is properly wearing the seatbelt based at least in part on the signals indicative of tension and the signals indicative of the length, for example, as described herein.

In some examples, the process 500 may include activating the motor to generate additional tension in the seatbelt for a predetermined period of time (e.g., up to thirty seconds) based at least in part on the occupant detector determining whether the occupant is properly wearing the seatbelt and an output of an event sensor. For example, the event sensor may be configured to determine one or more of when the occupant first enters the vehicle, a probability of a collision involving the vehicle, and arrival at a destination.

The example process 500, at 508, may further include controlling an operation associated with the vehicle including the seatbelt based at least in part on the determination of whether the occupant is properly wearing the seatbelt. For example, the occupant detector may generate signals indicative of whether the occupant is properly wearing the seatbelt, and those signals may be received by other vehicle systems, which may control aspects of one or more operations of the vehicle based on those signals, for example, as described herein. For example, based at least in part on the signals indicative of whether the occupant is properly wearing the seatbelt, the process 500 may include preventing motion of the vehicle associated with the seatbelt and/or causing the vehicle to exit a road and stop, for example, as described herein. For example, the signals indicative of whether the occupant is properly wearing the seatbelt may be received by a motion controller, which may prevent movement (or continued movement) of the vehicle, for example, as described herein. This may prevent operation (e.g., motion or continued travel) of the vehicle when it has been determined that one or more of the occupants of the vehicle is not wearing their seatbelt properly.

In some examples, the vehicle may include an airbag system including one or more airbags configured to protect occupants of the vehicle during a collision involving the vehicle. In some examples, the process 500 may include controlling the rate of deployment and/or the volume (or pressure) of deployment of at least one airbag based at least in part on the signals indicative of whether the seatbelt is being properly worn by the occupant, for example, as described herein.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Based on the foregoing, it should be appreciated that technologies for detecting seatbelt use have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

What is claimed is:

1. A seatbelt system comprising:
    a seatbelt comprising:
        a belt portion comprising a lap portion configured to constrain a waist of an occupant and a sash portion configured to constrain a torso of the occupant; and
        a coupling configured to couple a portion of a vehicle to at least one of the lap portion or the sash portion;
    a reel configured to receive one of at least a portion of the sash portion or at least a portion of the lap portion;
    a tension sensor associated with at least one of the coupling, the belt portion, or the reel and configured to generate a signal indicative of tension in at least one of the lap portion or the sash portion;
    a deployment sensor associated with one of the lap portion or the sash portion, the deployment sensor being configured to generate a signal indicative of a length of the lap portion or the sash portion deployed from the reel; and
    an occupant detector in communication with the tension sensor and the deployment sensor and configured to determine, based at least in part on the signal indicative of tension and the signal indicative of the length, whether an occupant is properly wearing the seatbelt, such that the lap portion and the sash portion constrain the occupant.

2. The seatbelt system of claim 1, further comprising a motor coupled to the reel and configured to tighten the belt portion, wherein the occupant detector is configured to determine, when the belt portion is tightened, based at least in part on the signal indicative of tension and the signal indicative of the length, whether the occupant is properly wearing the seatbelt.

3. The seatbelt system of claim 2, wherein the motor is further configured to generate tension in the seatbelt for a predetermined period of time based at least in part on the occupant detector determining whether the occupant is properly wearing the seatbelt and an output of an event sensor, the event sensor configured to determine one or more of:
    when the occupant first enters the vehicle,
    a probability of a collision involving the vehicle, or
    arrival at a destination.

4. The seatbelt system of claim 2, wherein the coupling is configured to provide selective engagement between the belt portion and the portion of the vehicle to which the coupling is coupled, and wherein the motor is configured to cause the reel to retract at least one of the lap portion or the sash portion upon engagement between the belt portion and the portion of the vehicle.

5. The seatbelt system of claim 1, wherein the reel receives at least a portion of the sash portion, and the deployment sensor is associated with the sash portion and is configured to generate a signal indicative of the length of the sash portion deployed from the reel.

6. The seatbelt system of claim 1, wherein the tension sensor is configured to generate a signal indicative of tension in the sash portion.

7. The seatbelt system of claim 1, further comprising:
    a transmitter associated with the sash portion and configured to a transmit signal; and
    a signal receiver configured to be associated with a portion of the vehicle and receive the signal transmitted by the transmitter,
    wherein the occupant detector is configured to receive the signal from the signal receiver and determine whether the occupant is properly wearing the seatbelt based in part on the signal received from the signal receiver.

8. The seatbelt system of claim 7, wherein the transmitter comprises a wireless transmitter.

9. The seatbelt system of claim 1, wherein the occupant detector is configured to generate a signal indicative of whether the seatbelt is being properly worn by the occupant, and
    wherein the system further comprises a motion controller configured to at least one of prevent motion of the vehicle or cause the vehicle to exit a road and stop, based at least in part on the signal indicative of whether the seatbelt is being properly worn by the occupant.

10. The seatbelt system of claim 1, further comprising an imager associated with the vehicle and configured to generate images of the occupant, and wherein the occupant detector is configured to determine, based at least in part on the images, whether the occupant is properly wearing the seatbelt.

11. The seatbelt system of claim 1, wherein the coupling comprises:
    a tongue coupled to at least one of the lap portion or the sash portion; and
    a receiver configured to be coupled to the portion of the vehicle and selectively engage the tongue,
    wherein the seatbelt system further comprises a coupling sensor configured to generate signal indicative of whether the receiver is engaged with the tongue, and
    wherein the occupant detector is configured to determine, based in part on the signal indicative of whether the receiver is engaged with the tongue, whether the occupant is properly wearing the seatbelt.

12. The seatbelt system of claim 1, further comprising a seat sensor configured to generate a signal indicative of whether the occupant is sitting in a seat associated with the vehicle, wherein the occupant detector is configured to determine, based in part on the signal indicative of whether the occupant is sitting in the seat, whether the occupant is properly wearing the seatbelt.

13. A method comprising:
    receiving a signal indicative of tension in at least one of a lap portion or a sash portion of a seatbelt;

receiving a signal indicative of a length of one of the lap portion or the sash portion deployed from a reel about which at least a portion of one of the lap portion or the sash portion is received;

determining, based at least in part on the signal indicative of tension and the signal indicative of the length, whether an occupant is properly wearing the seatbelt, such that the lap portion and the sash portion constrain the occupant; and controlling an operation associated with a vehicle comprising the seatbelt based at least in part on the determination.

14. The method of claim 13, further comprising:

activating a motor associated with the reel to tighten the seatbelt; and determining, when the seatbelt is tightened, whether the occupant is properly wearing the seatbelt based at least in part on the signal indicative of tension and the signal indicative of the length.

15. The method of claim 14, wherein the seatbelt comprises a belt portion and a coupling coupled to the belt portion and to a portion of the vehicle, the coupling being configured to provide selective engagement between the belt portion and the portion of the vehicle to which the coupling is coupled, and wherein the method further comprises:

detecting engagement between the belt portion and the portion of the vehicle;

activating the motor to cause the reel to retract a portion of the belt portion; and following activation of the motor, determining whether the occupant is properly wearing the seatbelt based at least in part on the signal indicative of tension and the signal indicative of the length.

16. The method of claim 13, further comprising:

receiving a signal from a transmitter associated with at least one of the lap portion or the sash portion; and determining, based in part on the signal received from the transmitter, whether the occupant is properly wearing the seatbelt.

17. The method of claim 13, further comprising:

generating a signal indicative of whether the seatbelt is being properly worn by the occupant; and based at least in part on the signal indicative of whether the seatbelt is being properly worn by the occupant, at least one of:

alerting the occupant that the seatbelt is not being properly worn;

charging the occupant a fee for not properly wearing the seatbelt;

altering a user profile associated with the occupant in a manner relating to failure to properly wear the seatbelt;

causing the vehicle to travel more slowly until the occupant properly wears the seatbelt;

preventing motion of the vehicle associated with the seatbelt; or causing the vehicle to exit a road and stop.

18. A vehicle comprising:
a chassis; and
a seatbelt comprising:
a belt portion configured to constrain at least one of a waist of an occupant or a torso of the occupant; and
a coupling coupled to the chassis and the belt portion;
a reel configured to receive at least a portion of the belt portion;
a tension sensor associated with at least one of the coupling, the belt portion, or the reel and configured to generate a signal indicative of tension in the belt portion;
a deployment sensor associated with the belt portion and configured to generate a signal indicative of a length of the belt portion deployed from the reel; and
an occupant detector in communication with the tension sensor and the deployment sensor and configured to determine, based at least in part on the signal indicative of tension and the signal indicative of the length, whether an occupant is properly wearing the seatbelt, such that the belt portion constrains the occupant.

19. The vehicle of claim 18, wherein the coupling is configured to provide selective engagement between the belt portion and the chassis of the vehicle, wherein the vehicle further comprises a motor coupled to the reel and configured to tighten the belt portion, the motor being configured to cause the reel to retract the belt portion upon engagement between the belt portion and the chassis, and wherein the occupant detector is configured to determine, when the belt portion is tightened and based at least in part on the signal indicative of tension and the signal indicative of the length, whether the occupant is properly wearing the seatbelt.

20. The vehicle of claim 18, further comprising:

a transmitter associated with the belt portion and configured to transmit a signal; and a signal receiver associated with a portion of the vehicle and configured to receive the signal transmitted by the transmitter, wherein the occupant detector is further configured to receive the signal from the signal receiver and determine whether the occupant is properly wearing the seatbelt based in part on the signal received from the signal receiver.

21. The vehicle of claim 18, wherein the occupant detector is configured to generate a signal indicative of whether the seatbelt is being properly worn by the occupant, and wherein the vehicle further comprises a motion controller configured to at least one of prevent motion of the vehicle or cause the vehicle to exit a road and stop, based at least in part on the signal indicative of whether the seatbelt is being properly worn by the occupant.

22. The vehicle of claim 18, further comprising an airbag system comprising at least one airbag configured to deploy at least one of prior to or during a collision involving the vehicle, wherein the occupant detector is configured to generate a signal indicative of whether the seatbelt is being properly worn by the occupant, and wherein at least one of the rate of deployment or the volume of deployment of the at least one airbag is based at least in part on the signal indicative of whether the seatbelt is being properly worn by the occupant.

* * * * *